United States Patent
Chen et al.

(10) Patent No.: US 7,574,596 B2
(45) Date of Patent: Aug. 11, 2009

(54) CRYPTOGRAPHIC METHOD AND APPARATUS

(75) Inventors: Liqun Chen, Bristol (GB); Martin Sadler, Bristol (GB); Keith Alexander Harrison, Woodcroft Chepstow (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 849 days.

(21) Appl. No.: 10/831,549

(22) Filed: Apr. 22, 2004

(65) Prior Publication Data

US 2005/0005121 A1    Jan. 6, 2005

(30) Foreign Application Priority Data

Apr. 23, 2003 (GB) ................... 0309157.6
May 22, 2003 (GB) ................... 0311786.8

(51) Int. Cl.
G06F 9/00 (2006.01)
(52) U.S. Cl. .................. 713/159; 713/161; 713/169
(58) Field of Classification Search ................ 713/159, 713/161, 169
See application file for complete search history.

(56) References Cited

U.S. PATENT DOCUMENTS

| 4,926,480 A | 5/1990 | Chaum | 705/69 |
| 5,436,972 A | 7/1995 | Fischer | 380/286 |
| 6,446,205 B1 | 9/2002 | Lenstra | 713/168 |
| 7,103,911 B2 | 9/2006 | Spies et al. | 726/3 |
| 7,113,594 B2 | 9/2006 | Boneh et al. | 380/28 |
| 2002/0164026 A1 | 11/2002 | Huima | 380/247 |
| 2003/0081785 A1 | 5/2003 | Boneh et al. | |
| 2004/0019779 A1 | 1/2004 | Harrison et al. | 713/150 |

FOREIGN PATENT DOCUMENTS

| EP | 0 891 053 A2 | 1/1999 |
| EP | 1 392 018 A1 | 2/2004 |
| GB | 2 370 471 A | 6/2002 |
| GB | 2 391 139 A | 1/2004 |
| GB | 2 395 872 A | 6/2004 |
| WO | WO 03/017559 A2 | 2/2003 |
| WO | WO 2004/047352 A2 | 9/2004 |

OTHER PUBLICATIONS

U.S. Appl. No. 10/831,350, filed Apr. 22, 2004, Chen et al.

(Continued)

*Primary Examiner*—Thomas R Peeso
(74) *Attorney, Agent, or Firm*—Robert F. Squibbs

(57) ABSTRACT

First data to be sent by a first party to a second party is encrypted using an encryption key string formed using at least a hash value generated using second data and a secret, shared with a trusted party, that serves as identification of the first party. The second data comprises, for example, one or more conditions that serve as identifiers of the second party, and a hash-value element generated by hashing the first data. The encrypted first data and the encryption key string is made available to the second party which forwards the encryption key string to the trusted party with a request for the corresponding decryption key. The trusted party carries out at least one check on the basis of data contained in the encryption key string and, if this at least one check is satisfactory, provides a decryption key to the second party.

46 Claims, 4 Drawing Sheets

OTHER PUBLICATIONS

U.S. Appl. No. 10/831,548, filed Apr. 22, 2004, Chen et al.

U.S. Appl. No. 10/831,776, filed Apr. 22, 2004, Chen et al.

Levy, I., "An Overview of Identifier-Based Public Key Cryptography," *Internet and Wireless Security*, pp. 121-131 (2002).

*The HP Time Vault Service: Innovating the Way Confidential Information is Disclosed, at the Right Time*, Hewlett-Packard Company, accessed via Internet at http://www.hpl.hp.com/research/tsl/external%20publications/tech%20reports/HPL-2002-243.pdf (2002).

Shamir, A., "Identity-Based Cryptosystems and Signature Schemes," *Advances in Crypotology—CRYPTO '84, Lecture Notes in Computer Science*, vol. 196, pp. 47-53 (1985).

Boneh, D. and M. Franklin, "Identity-Based Encryption from the Weil Pairing," *Advances in Cryptology—CRYPTO* 2001, LNCS 2139, pp. 213-229, Springer-Verlag (2001).

Boneh, D., et al., "Identity-Based Mediated RSA," *3rd Workshop on Information Security Application*, Jeju Island, Korea, 12 pages (Aug. 2002).

Cocks, C., "An Identity Based Encryption Scheme Based on Quadratic Residues," *Proceedings of the 8th IMA International Conference on Cryptography and Coding*, LNCS 2260, pp. 360-363, Springer-Verlag (2001).

http:www.hpl.hp.com/techreports/2003/HPL-2003-18.pdf (2003).

Microsoft ComputerDictionary, Fifth Edition Excerpt http://proquest.safaribooksonline.com/0735614954/ch04 (May 1, 2002).

CGI Programming with Perl, 2nd Edition Excerpt, http://proquest.safaribooksonline.com/1565924193/ch08-49507#snippet.

CRYPTOGRAPHIC METHOD AND APPARATUS

CROSS REFERENCE TO RELATED APPLICATIONS

This application is related to the following US patent applications filed by the assignee of the present application: U.S. Ser. No. 10/831,776 entitled "Cryptographic Method and Apparatus" filed 22 Apr. 2004; U.S. Ser. No. 10/831,350 entitled "Cryptographic Method and System" filed 22 Apr. 2004; and U.S. Ser. No. 10/831,548 entitled "Cryptographic Method and System" filed 22 Apr. 2004.

FIELD OF THE INVENTION

The present invention relates to cryptographic methods and apparatuses and, in particular, but not exclusively, to such methods and apparatuses that use Identifier-Based Encryption.

BACKGROUND OF THE INVENTION

Identifier-Based Encryption (IBE) is an emerging cryptographic schema. In this schema (see FIG. 1 of the accompanying drawings), a data provider 10 encrypts payload data 13 using both an encryption key string 14, and public data 15 provided by a trusted authority 12. This public data 15 is derived by the trusted authority 12 using private data 17 and a one-way function 18. The data provider 10 then provides the encrypted payload data <13> to a recipient 11 who decrypts it, or has it decrypted, using a decryption key computed by the trusted authority 12 based on the encryption key string and its own private data.

A feature of identifier-based encryption is that because the decryption key is generated from the encryption key string, its generation can be postponed until needed for decryption.

Another feature of identifier-based encryption is that the encryption key string is cryptographically unconstrained and can be any kind of string, that is, any ordered series of bits whether derived from a character string, a serialized image bit map, a digitized sound signal, or any other data source. The string may be made up of more than one component and may be formed by data already subject to upstream processing. In order to avoid cryptographic attacks based on judicious selection of a key string to reveal information about the encryption process, as part of the encryption process the encryption key string is passed through a one-way function (typically some sort of hash function) thereby making it impossible to choose a cryptographically-prejudicial encryption key string. In applications where defence against such attacks is not important, it would be possible to omit this processing of the string.

Frequently, the encryption key string serves to "identify" the intended message recipient and this has given rise to the use of the label "identifier-based" or "identity-based" generally for cryptographic methods of the type under discussion. However, depending on the application to which such a cryptographic method is put, the string may serve a different purpose to that of identifying the intended recipient and, indeed, may be an arbitrary string having no other purpose than to form the basis of the cryptographic processes. Accordingly, the use of the term "identifier-based" or "IBE" herein in relation to cryptographic methods and systems is to be understood simply as implying that the methods and systems are based on the use of a cryptographically unconstrained string whether or not the string serves to identify the intended recipient. Generally, in the present specification, the term "encryption key string" or "EKS" is used rather than "identity string" or "identifier string"; the term "encryption key string" is also used in the shortened form "encryption key" for reasons of brevity.

A number of IBE algorithms are known and FIG. 2 indicates, for three such algorithms, the following features, namely:

the form of the encryption parameters used, that is, the encryption key string and the public data of the trusted authority (TA);

the conversion process applied to the encryption key string to prevent attacks based on judicious selection of this string;

the primary encryption computation effected;

the form of the encrypted output.

The three prior art IBE algorithms to which FIG. 2 relates are:

Quadratic Residuosity (QR) method as described in the paper: C. Cocks, "An identity based encryption scheme based on quadratic residues", Proceedings of the $8^{th}$ IMA International Conference on Cryptography and Coding, LNCS 2260, pp 360-363, Springer-Verlag, 2001. A brief description of this form of IBE is given hereinafter.

Bilinear Mappings p using, for example, a Tate pairing t or Weil pairing ê. Thus, for the Weil pairing:

$$\hat{e}: G_1 \times G_1 \to G_2$$

where $G_1$ and $G_2$ denote two algebraic groups of prime order q and $G_2$ is a subgroup of a multiplicative group of a finite field. The Tate pairing can be similarly expressed though it is possible for it to be of asymmetric form:

$$t: G_1 \times G_0 \to G_2$$

where $G_0$ is a further algebraic group the elements of which are not restricted to being of order q. Generally, the elements of the groups $G_0$ and $G_1$ are points on an elliptic curve though this is not necessarily the case. A description of this form of IBE method, using Weil pairings is given in the paper: D. Boneh, M. Franklin—"Identity-based Encryption from the Weil Pairing" in *Advances in Cryptology-CRYPTO* 2001, LNCS 2139, pp. 213-229, Springer-Verlag, 2001.

RSA-Based methods The RSA public key cryptographic method is well known and in its basic form is a two-party method in which a first party generates a public/private key pair and a second party uses the first party's public key to encrypt messages for sending to the first party, the latter then using its private key to decrypt the messages. A variant of the basic RSA method, known as "mediated RSA", requires the involvement of a security mediator in order for a message recipient to be able to decrypt an encrypted message. An IBE method based on mediated RSA is described in the paper "Identity based encryption using mediated RSA", D. Boneh, X. Ding and G. Tsudik, 3rd Workshop on Information Security Application, Jeju Island, Korea, August, 2002.

A more detailed description of the QR method is given below with reference to the entities depicted in FIG. 1 and using the same notation as given for this method in FIG. 2. In the QR method, the trust authority's public data 15 comprises a value N that is a product of two random prime numbers p and q, where the values of p and q are the private data 17 of the trust authority 12. The values of p and q should ideally be in the range of $2^{511}$ and $2^{512}$ and should both satisfy the equation: $p, q \equiv 3 \mod 4$. However, p and q must not have the same value. Also provided is a hash function # which when applied to a string returns a value in the range 0 to N−1.

Each bit of the user's payload data 13 is then encrypted as follows:

The data provider 10 generates random numbers $t_+$ (where $t_+$ is an integer in the range $[0, 2^N]$) until a value of $t_+$ is found that satisfies the equation $jacobi(t_+,N)=m'$, where m' has a value of −1 or 1 depending on whether the corresponding bit of the user's data is 0 or 1 respectively. (As is well known, the jacobi function is such that where $x^2 \equiv \#$ mod N the jacobi (#, N)=−1 if x does not exist, and =1 if x does exist). The data provider 10 then computes the value:

$$s_+ \equiv (t_+ + K/t_+) \bmod N$$

where: $s_+$ corresponds to the encrypted value of the bit m' concerned, and $$K = \#(\text{encryption key string})$$

Since K may be non-square, the data provider additionally generates additional random numbers $t_-$ (integers in the range $[0, 2^N)$) until one is found that satisfies the equation $jacobi(t_-,N)=m'$. The data provider 10 then computes the value:

$$s_- \equiv (t_- - K/t_-) \bmod N$$

as the encrypted value of the bit m concerned.

The encrypted values $s_+$ and $s_-$ for each bit m' of the user's data are then made available to the intended recipient 11, for example via e-mail or by being placed in a electronic public area; the identity of the trust authority 12 and the encryption key string 14 will generally also be made available in the same way.

The encryption key string 14 is passed to the trust authority 12 by any suitable means; for example, the recipient 11 may pass it to the trust authority or some other route is used—indeed, the trust authority may have initially provided the encryption key string. The trust authority 12 determines the associated private key B by solving the equation:

$$B^2 \equiv K \bmod N (\text{"positive" solution})$$

If a value of B does not exist, then there is a value of B that is satisfied by the equation:

$$B^2 \equiv -K \bmod N (\text{"negative" solution})$$

As N is a product of two prime numbers p, q it would be extremely difficult for any one to calculate the decryption key B with only knowledge of the encryption key string and N. However, as the trust authority 12 has knowledge of p and q (i.e. two prime numbers) it is relatively straightforward for the trust authority 12 to calculate B.

Any change to the encryption key string 14 will result in a decryption key 16 that will not decrypt the payload data 13 correctly. Therefore, the intended recipient 11 cannot alter the encryption key string before supplying it to the trust authority 12.

The trust authority 12 sends the decryption key to the data recipient 11 along with an indication of whether this is the "positive" or "negative" solution for B.

If the "positive" solution for the decryption key has been provided, the recipient 11 can now recover each bit m' of the payload data 13 using:

$$m' = jacobi(s_+ + 2B, N)$$

If the "negative" solution for the decryption key B has been provided, the recipient 11 recovers each bit m' using:

$$m' = jacobi(s_- + 2B, N)$$

Returning now to a general consideration of IBE encryption, one application is to enable the data provider 10 to provide encrypted payload data over an unprotected communications path for receipt and decryption by a recipient 11 that meets certain conditions, namely condition 1 and condition 2. Typically, the conditions serve to identify the intended recipient in some manner and can therefore be considered as the recipient's identifiers by the requesting data receiver 11; however, other conditions are also possible such as a time or date condition. To ensure that the conditions are met before a recipient can read the payload data 13, the conditions are placed in the IBE encryption key string 14 and sent along with the encrypted payload data. Upon receipt, the data receiver 11 passes the encryption key string to the trusted authority 12 with a request for the corresponding IBE decryption key 16. The trusted authority 12 only provides the decryption key (over a secure channel) if satisfied that the conditions 1 and 2 included in the encryption key are met.

The foregoing example exhibits a number of potential drawbacks. More particularly, the conditions are transmitted in clear which may be undesirable particularly where the conditions are identifiers of the intended data receiver. Furthermore, there is no sender authentication check enabling the recipient to reliable know who sent the message, nor any integrity check for the payload data; of course, these latter drawback could be overcome by the use of digital signatures and public key certificates based on RSA asymmetric key cryptography but this involves substantial additional cryptographic processing by the data receiver and a public key infrastructure (PKI) for supporting the use of public key certificates.

It is an object of the present invention to obviate one or more of the following drawbacks with no or minimal additional cryptographic processing by the data receiver.

SUMMARY OF THE INVENTION

According to one aspect of the present invention, there is provided a data encryption method comprising a first party encrypting first data using as encryption parameters both:
  an encryption key string formed using at least a hash value generated using both second data and a secret, shared with a trusted party, that serves as identification of the first party; and
  public data provided by the trusted party and related private data held by the trusted party.

According to another aspect of the present invention, there is provided a data encryption method comprising encrypting first data using both an encryption key string and public data provided by a trusted party and related to private data of the trusted party; the encryption key string comprising:
  a first component comprising the public key of a public/private key pair associated with the first party and the private key of which is available to the trusted party;
  a second component comprising none, one or more non-confidential conditions serving as identifiers of an intended recipient of the first data;
  a third component comprising a hash value generated using both the private key of said public/private key pair and second data comprising said non-confidential conditions if any, one or more confidential conditions that also serve as identifiers of said intended recipient, and a hash-value element generated by hashing the first data; and
  a fourth component formed by encrypting data comprising said confidential conditions if any, and said hash-value element generated by hashing the first data.

According to a further aspect of the present invention, there is provided a data transfer method comprising:

encrypting first data at a first party using an encryption method according to either of the preceding two paragraphs and sending the encrypted first data and the encryption key string to a second party;

providing the encryption key string from the second party to the trusted party;

at the trusted party, carrying out at least one check on the basis of data contained in the encryption key string and, if said at least one check is satisfactory, providing a decryption key to the second party, this decryption key being generated by the trusted party using the encryption key string and its private data.

By using an encryption key string that comprises a hash value generated using second data and a secret shared by the first party and the trusted party, provided the trusted party also has access to the elements making up the second data, the trusted party can check that the second data is associated with the party identified by the shared secret. Preferably, the second data comprises a hash of the first data thereby enabling the trusted party to assure the second party about the origin of the message and provide it with the means for checking its integrity.

The present invention also envisages apparatus for carrying out the encryption method of the invention, and apparatus for carrying out the actions of the trusted party according to the data transfer method of the invention. The present invention further envisages a computer program product for conditioning programmable apparatus for carrying out the encryption method of the invention, and a computer program product for conditioning programmable apparatus for carrying out the actions of the trusted party according to the data transfer method of the invention.

BRIEF DESCRIPTION OF THE DRAWINGS

Embodiments of the invention will now be described, by way of non-limiting example, with reference to the accompanying diagrammatic drawings, in which.

BEST MODE OF CARRYING OUT THE INVENTION

Figure 3:
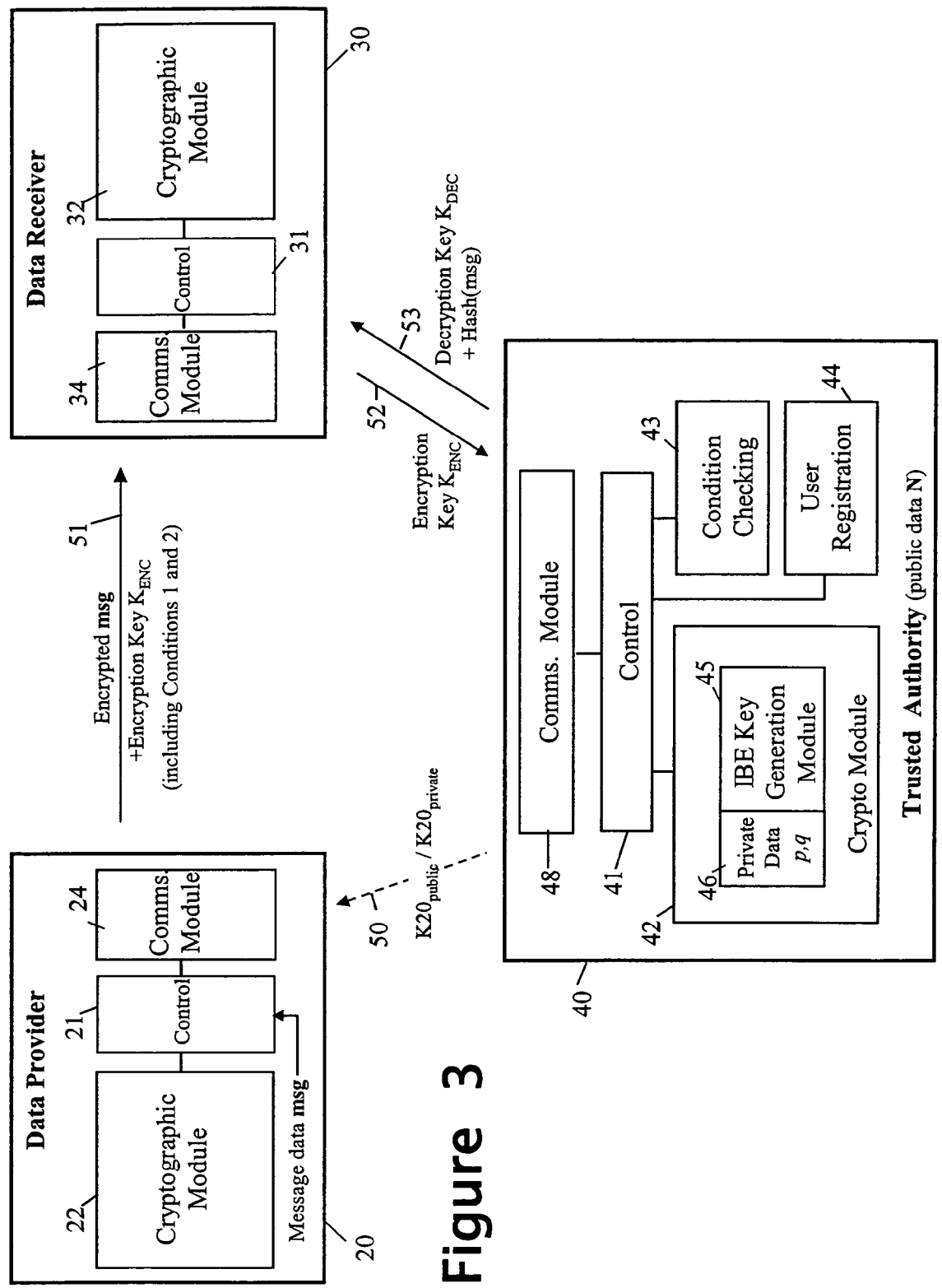
FIG. 3 is a diagram of a system embodying the present invention.

FIG. 3 illustrates a system embodying the present invention, the system comprising a first computing entity 20 associated with a data provider party; a second computing entity 30 associated with a data receiver party; and a third computing entity 40 associated with a trusted authority. The computing entities 20, 30 and 40 are typically based around general-purpose processors executing stored programs but may include dedicated cryptographic hardware modules. The computing entities 20, 30 and 40 inter-communicate as needed (see arrows 50-53) via, for example, the internet or other network, though it is also possible that at least some of the entities actually reside on the same computing platform.

In the following, references to the data provider, data receiver and the trusted authority are generally used interchangeably with references to their respective computing entities 20, 30 and 40.

In functional terms, the data-provider entity 20 comprises a communications module 24 for communicating with the entities 30 and 40, a control module 21 for controlling the general operation of the entity 20, and a cryptographic module 22 for executing certain cryptographic functions comprising a hash function and an IBE encryption function.

The data-receiver entity 30 comprises a communications module 34 for communicating with the entities 20 and 40, a control module 31 for controlling the general operation of the entity 30, and a cryptographic module 32 for executing certain cryptographic functions comprising a hash function (the same as that used by the entity 20) and an IBE decryption function.

The trusted authority entity 40 comprises a communications module 48 for communicating with the entities 20 and 30, a control module 41 for controlling the general operation of the entity 40, a cryptographic module 42 for executing certain cryptographic functions, a condition checking module 43, and a user registration module 44. The cryptographic module 42 is arranged to implement both a hash function (the same as that used by the entity 20) and an IBE decryption function; in addition, the module 42 includes a unit 45 for generating an IBE decryption key using both a supplied encryption key string and private data securely held in local store 46.

Figure 1:
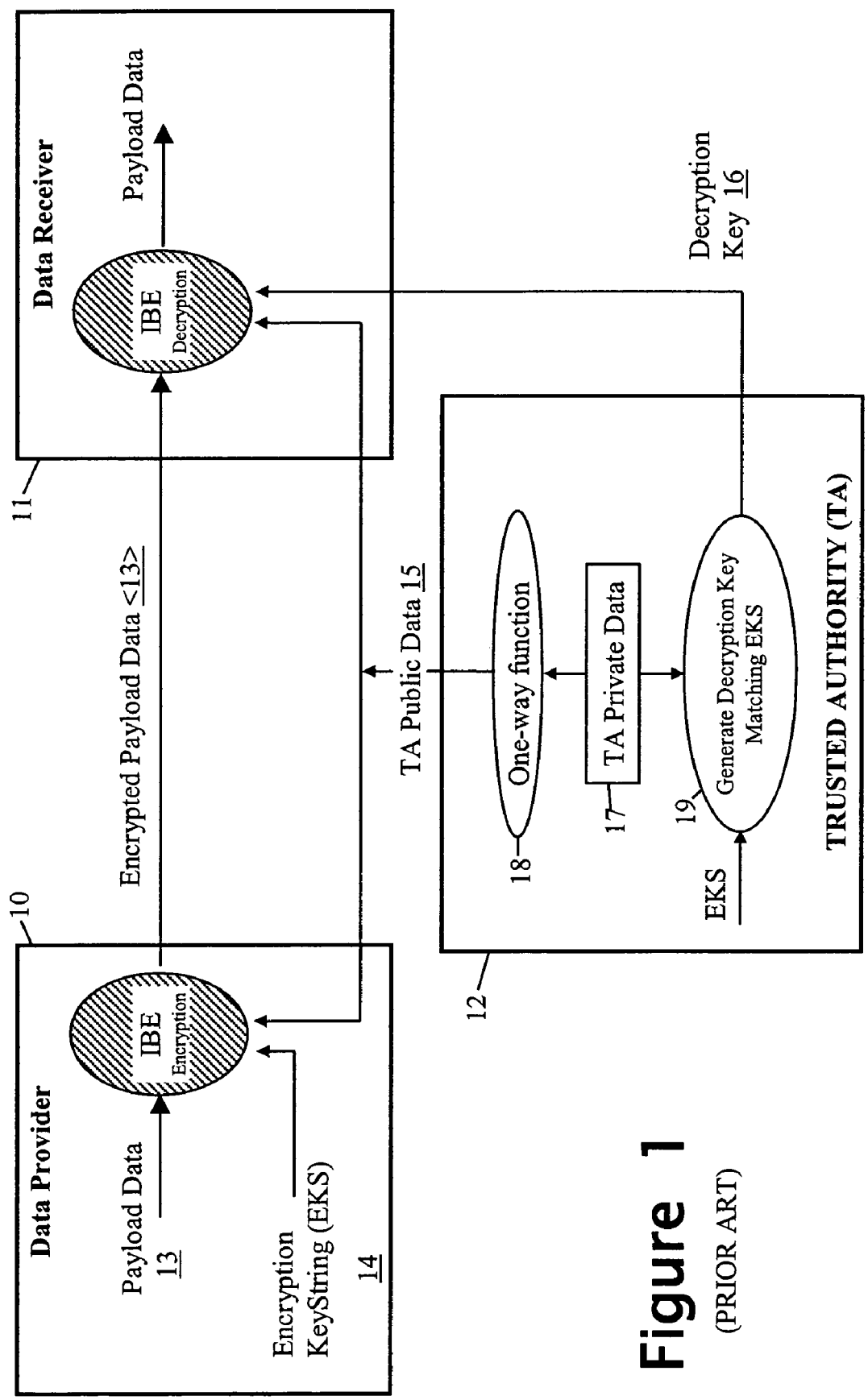
FIG. 1 is a diagram illustrating the operation of a prior art encryption schema known as Identifier-Based Encryption.

The system employs Identifier-Based Encryption with the computing entities 20, 30 and 40 having, in respect of IBE encryption/decryption, the roles of the data provider 10, data recipient 11 and trusted authority 12 of the FIG. 1 IBE arrangement. The IBE algorithm used is, for example, the QR algorithm described above with respect to FIG. 1 with the private data held in store 46 being random prime numbers p,q and the corresponding public data being number N.

Consider the situation where the data provider 20 wishes to encrypt message data ("msg") for sending over an unprotected communications path for receipt and decryption by a recipient that meets certain conditions, namely Condition 1 and Condition 2. These Conditions 1 and 2 are unknown to the data receiver 30 and the data provider 20 wishes to keep Condition 2 confidential from the data receiver 30.

It is assumed that the data provider 20 has previously registered with the trusted authority 40 and obtained (see arrow 50) a public/private key pair $K20_{public}/K20_{private}$ where $K20_{public}$ is simply a public identifier of provider 20 (such as a name) and $K20_{private}$ is the IBE decryption key formed by the trusted authority using the $K20_{public}$ as an IBE encryption key and its private data p,q. The user registration module 44 is responsible at the time of registration for ensuring that the public key $K20_{public}$ is a correct identifier of the data provider 20; the module 44 is also arranged to keep a record of currently valid registered users.

To encrypt the message data msg, the data provider 20 first forms an IBE encryption key string $K_{ENC}$ comprising:

$K20_{public}$

:: Condition 1

:: $H(K20_{private}$ :: H(msg) :: nonce :: Condition 1 :: Condition 2)

:: $E(K20_{public}, N; (H(msg)$ :: nonce :: Condition 2))

where:

:: means concatenation,

H(x) means the hash of data x using any suitable hash function such as SHA1,

E(k,n;y) means the IBE encryption of data y using encryption key string k and the public data n of a trusted authority, and a nonce is a one-time use random number selected by the data provider 20 and provided for freshness.

The process of forming the encryption key string $K_{ENC}$ is carried out by the cryptographic module 22 under the direction of the control module 21.

As can be seen, whilst Condition 1 is visible in the encryption key string $K_{ENC}$, the Condition 2 only appears in encrypted form. Furthermore, the encryption key string $K_{ENC}$ includes a hash of the message data msg, and a hashed quantity that includes both the data-provider's private key $K20_{private}$ and the message data hash; as will be seen hereinafter, this enables the trusted authority 40 to check the origin of the encryption key string $K_{ENC}$ and the integrity of the message hash.

After the key $K_{ENC}$ has been generated, the control module 21 causes the cryptographic module 22 to use the key and the trusted authority's public data N to encrypt the message data msg. The encrypted data and the encryption key string $K_{ENC}$ are then made available by the communications module 24 to the data receiver 30 (see arrow 51).

On receiving the encrypted message data and the encryption key string $K_{ENC}$, the control module 31 of the data receiver 30 may, if it understands the structure of the encryption key string, examine the identity $K20_{public}$ of the data provider 20 and the unencrypted Condition 1. If the data receiver determines that it wants to read the message data and that it meets Condition 1, or if the data receiver decides to proceed without checking Condition 1 (for example, because it does not know the structure of the encryption key string), the control module 31 causes the encryption key string $K_{ENC}$ to be sent (arrow 52) to the trusted authority 40 with a request for the corresponding decryption key $K_{DEC}$.

Figure 4:
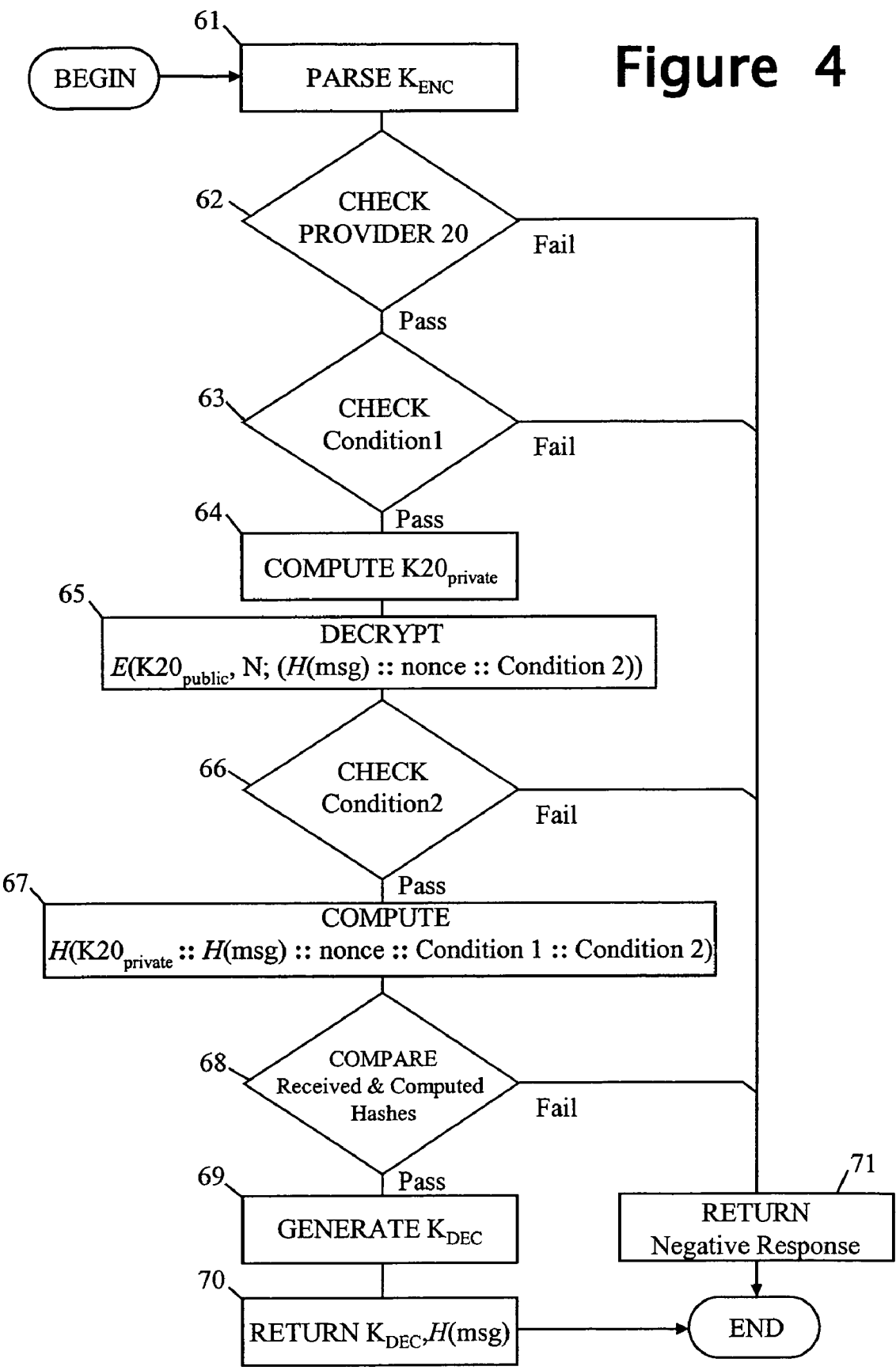
FIG. 4 is a flow chart of a process carried out by a trusted authority of the FIG. 3 system.

On receipt of the request from the data receiver 30 for the decryption key $K_{DEC}$, the control module 41 of the trusted authority 40 oversees the processing represented by the flow chart of FIG. 4. More particularly, the control module 41 first parses (step 61) the encryption key string $K_{ENC}$ provided with the request into its four constituent components (the four concatenated components listed above)—this typically being done on the basis of predetermined separators inserted between the concatenated components.

Next, the control module 41 passes the component formed by the data provider's public key $K20_{public}$ to the module 44 in order to determine whether the data provider 20 is still a valid registered user of the services of the trusted authority 40 (step 62). If this check fails, a negative response is returned to the requesting data receiver 30 (step 72) and processing terminates; otherwise processing proceeds. In fact, the trusted authority 40 may decide to skip this check and simply proceed directly to the following processing steps.

The next processing step (step 63) involves the control module 41 passing the Condition 1 component extracted from the encryption key string $K_{ENC}$ to the condition checking module 43 for it to determine whether the data receiver 30 satisfies this condition. Condition checking may involve the consultation of internal and/or external databases and/or the interrogation of the data receiver 30 (for which purpose the latter may be implemented on a trusted computing platform). If this check fails, a negative response is returned to the requesting data receiver 30 (step 72) and processing terminates; otherwise processing proceeds.

The following step (step 64) involves the control module 41 obtaining the data provider's private key $K20_{private}$. Whilst this key could have been stored in the user registration module 44 and retrieved against the data provider's public key $K20_{public}$ (as extracted from the encryption key string $K_{ENC}$), it is simpler to have the key generation unit 45 regenerate the $K20_{private}$ using the data provider's public key $K20_{public}$ and the private data p,q held in storage 46.

Once the private key $K20_{private}$ has been obtained, it is used (step 65) to decrypt the encrypted component of the encryption key string $K_{ENC}$ in order to reveal:

H(msg) :: nonce :: Condition 2 this expression thereafter being separated into its three constituent elements.

Next, the control module 41 passes the now-decrypted Condition 2 to the condition checking module 43 for it to determine whether the data receiver 30 satisfies this condition (step 66). If this check fails, a negative response is returned to the requesting data receiver 30 (step 72) and processing terminates; otherwise processing proceeds.

Following the successful check of Condition 2, the control module 41 causes the hash:

H($K20_{private}$ :: H(msg) :: nonce :: Condition 1 :: Condition 2)

to be recomputed (step 67) using the key $K20_{private}$ obtained in step 64, the values of H(msg), the nonce and Condition 2 obtained by the decryption in step 65 of the encrypted data contained in $K_{ENC}$, and the Condition 1 obtained in step 61 from parsing $K_{ENC}$. This re-computed hash value is then compared (step 68) with the corresponding hash component contained in the encryption $K_{ENC}$. If these hash values are different then clearly something is wrong and a negative response is returned to the requesting data receiver 30 (step 72) and processing terminates.

However, if the hash values match, the trusted authority 40 accepts that the data provider is the entity associated with the private key $K20_{private}$ and thus with the public key $K20_{public}$; the trusted authority also accepts that the message hash H(msg) is reliable. The control module 41 now causes the key generation unit 45 to compute (step 69) the decryption key $K_{DEC}$ using the encryption key string $K_{ENC}$ and the private data p,q. Finally, the trusted authority 40 returns (step 70) the decryption key $K_{DEC}$ together with H(msg) to the data receiver 30 (see arrow 53, FIG. 3).

It will be appreciated that the ordering of the checking steps 62, 63, 66 and 68 relative to each other and to the other steps of the FIG. 4 is not critical (subject to the items concerned having become available) save that the steps 62, 63, 66 and 68 need to be carried out before the decryption key $K_{DEC}$ is sent to the data receiver in step 70.

On receiving the decryption key $K_{DEC}$ the data receiver 30 uses it to decrypt the encrypted message data after which it computes the hash of the message and compares it with that received from the trusted authority 40 as a final check on the message integrity. The data receiver 30 now has the integrity-checked decrypted message and can be sure that the trusted authority 40 is happy that the data provider 20 is as identified by the public key $K20_{public}$ included in clear in the encryption key string $K_{ENC}$.

In the foregoing process, the only additional burden placed on the data receiver 30 is the message integrity check involving forming a hash of the message and comparing it with the message hash supplied by the trusted authority 40; otherwise, the functioning of the data receiver 30 is exactly as for any basic IBE system with the data receiver 30 passing the encryption key string $K_{ENC}$ to the trusted authority 40 and receiving back the decryption key $K_{DEC}$. If the data receiver is prepared to pass the encrypted message to the trusted authority, then even the message integrity check can be carried out by the trusted authority.

Figure 2:
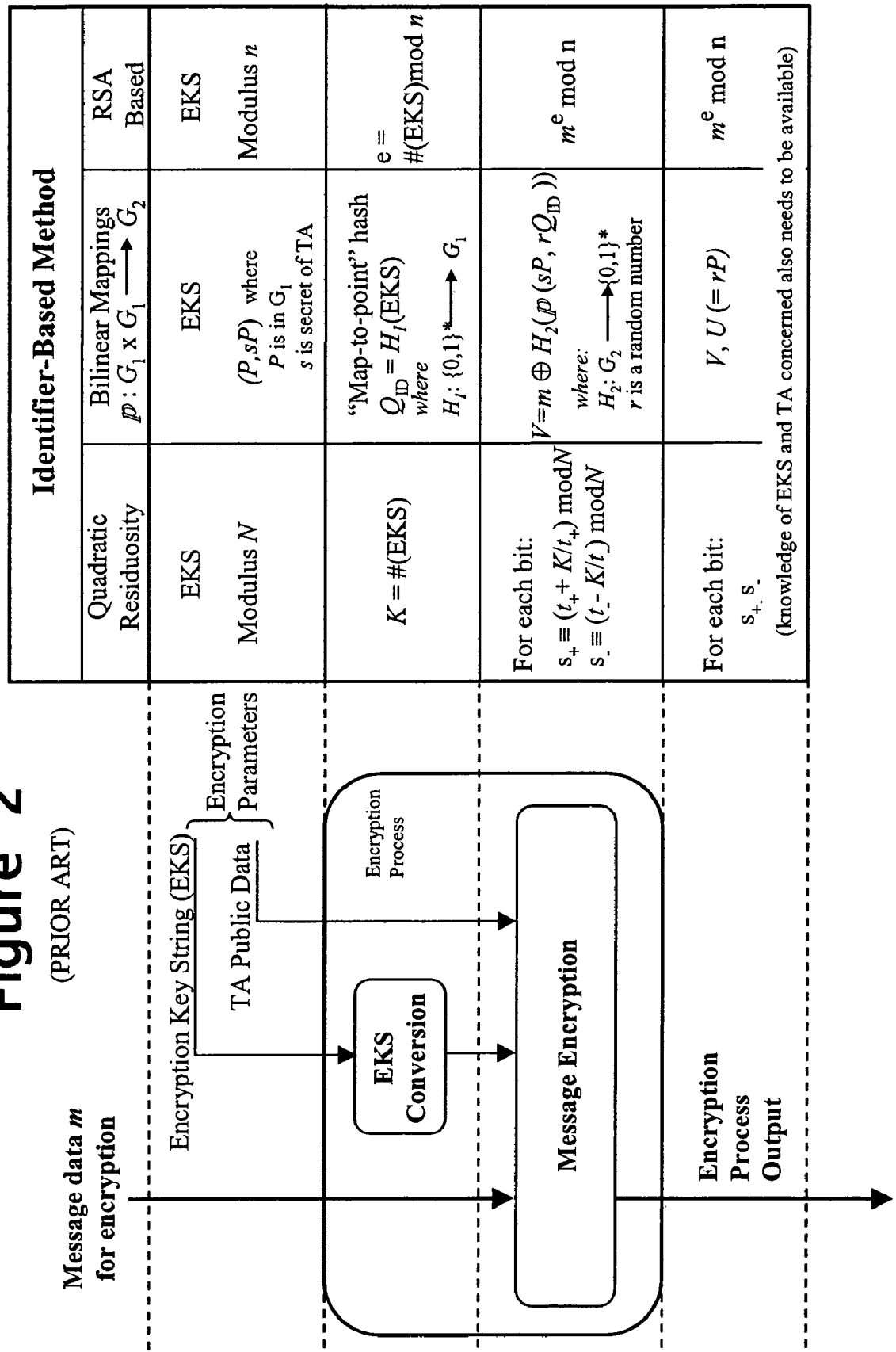
FIG. 2 is a diagram illustrating how certain IBE operations are implemented by three different prior art IBE methods.

The process described above with respect to FIGS. 2 and 3 not only provides the advantages of data-provider authentication carried out by the trusted authority 40, and a check on the integrity of the message hash, but also enables the data provider 20 to include a hidden condition (Condition 2 in the example) in the encryption key string $K_{ENC}$ only visible to the trusted authority 40 and not to the data receiver 30. Whilst the data provider 20 must, of course, know how to form the multi-component encryption key string $K_{ENC}$, the data receiver 30 need know nothing of the structure of this key, it being relieved of this burden by the trusted authority 40. Placing all the provider authentication and message integrity components into the encryption key string $K_{ENC}$ intimately ties these components to the encrypted message data.

Many variants are possible to the above-described embodiment. For example, instead of the QR IBE method being used for the encrypting and decrypting the message data msg, other, analogous, cryptographic methods can be used such as IBE methods based on Weil or Tate pairings. Furthermore, the data $K_{ENC}$ may be subject to further predetermined processing (such as a further hash) before being used in the operative encryption process and in this case the trusted authority will need to use the same processed value of $K_{ENC}$ when generating $K_{DEC}$ (it will, however, be appreciated that the trusted authority will need to receive $K_{ENC}$ unprocessed in order for it to be able to access the individual components of $K_{ENC}$). These generalizations also apply to the variants discussed below.

In the above-described embodiment, the data provider's public key $K20_{public}$ is used in clear in the encryption key string $K_{ENC}$ to identify the data provider and to encrypt the encrypted component of the encryption key string $K_{ENC}$, whilst the corresponding private key $K20_{private}$ is used as an authenticator of the identity of the data provider by its inclusion in the hashed component of the encryption key string $K_{ENC}$. Although in the above embodiment this public/private key pair $K20_{public}/K20_{private}$ is an IBE encryption/decryption key pair, this need not be the case and the public/private key pair could, for example, be an RSA public/private key pair. In this case, the private key used to authenticate the data provider 20 cannot be computed in step 64 and must be accessed by look up in a database kept by the user registration module 44 relating private key to the data-provider identifier, such as the public key, included in clear in the encryption key string $K_{ENC}$. A potential drawback of using an RSA public/private key pair is that if the public key is used as the in-clear data-provider identifier included in the encryption key string $K_{ENC}$, the real-world identity of the data provider may not be apparent to the data receiver and will generally need translation. In fact, the in-clear data-provider identifier included in the encryption key string $K_{ENC}$ need not be the public key of the public/private key pair (whether IBE or RSA based) but can be any valid identity for the data provider that is known and accepted by the trusted authority as corresponding to the private key it holds for the data provider 20.

It is also possible to use a symmetric key known only to the data provider and the trusted authority to form the encrypted component of the encryption key string $K_{ENC}$ and for inclusion in the hashed component in place of $K20_{private}$. In this case, the in-clear identifier of the data provider that is included in the encryption key string $K_{ENC}$ would not, of course, be this key but would be an identifier known by the trusted authority as associated with the data provider and thus with the symmetric key concerned.

It may be noted that the key used for encrypting the encrypted component of the encryption key string $K_{ENC}$ need not be cryptographically related to the key used in the hashed component of $K_{ENC}$—all that is required is that the key used for encrypting the encrypted component of the encryption key string $K_{ENC}$ is confidential to the data provider 20 and the trusted authority 40 and is known by the latter to belong to the same party as the key used in the hashed component of the key $K_{ENC}$.

It may also be noted that where there are only a few users registered with the trusted authority, it would be possible to omit the first component $K20_{public}$ (or other in-clear identifier of the data provider 20) and simply arrange for the trusted authority 40 to try out the keys/key pairs of all registered users to see if the message came from a registered user. If a key/key pair was found that both sensibly decrypted the encrypted component of $K_{ENC}$ and gave rise to a computed hash matching the hashed component of $K_{ENC}$, the identity of the data provider can be considered as established and can be passed to the data receiver if the latter needed to know this identity.

As already indicated, the form of encryption key string $K_{ENC}$ described above with reference to FIGS. 2 and 3 serves at least three purposes besides encryption of the message data msg; more particularly, it provides for passing a condition in confidence to the trusted authority, for authentication of the data provider to the trusted authority, and for the transmission and checking of message integrity data (the message hash). However, where only one or two of these functions is required, the form of the encryption key string $K_{ENC}$ can be simplified.

Considering first the authentication of the data provider, this is achieved by including in the encryption key string $K_{ENC}$ a hash of a shared secret known to the data provider 20 and the trusted authority 40; in the illustrated embodiment this shared secret is the private key $K20_{private}$ but, as discussed, could be an RSA private key of the data provider or a symmetric key, or indeed any shared secret. The presence in the encryption key string of the Conditions 1 and 2 is not relevant to this data-provider authentication function so that the example encryption key string $K_{ENC}$ given above can be reduced to:

$K20_{public}$
:: $H(K20_{private}$ :: $H(msg)$ :: nonce$)$
:: $E(K20_{public}, N; (H(msg)$ :: nonce$))$ As already noted, where there are only a few users registered with the trusted authority, the first component $K20_{public}$ can be omitted. Furthermore, the nonce could be omitted from both the encrypted and hashed components of $K_{ENC}$ provided freshness was not required. However, retention of the message hash $H(msg)$ in both the hashed component and the encrypted (or, alternatively, in the in-clear) component of $K_{ENC}$ is necessary where it is desired to retain a link between the originator identity established for the encryption key $K_{ENC}$ and a message encrypted with this key—removal of the message hash $H(msg)$ would enable the encryption key string $K_{ENC}$ to be used by a third party for encrypting a message which might then appear to come from the data provider 20 in view of the latter's identity being embedded in the encryption key string $K_{ENC}$. In fact, it is possible to envisage circumstances where the original of the encryption key string $K_{ENC}$ is of a significance independent of the origin of a message encrypted with that key. For example, where the encryption key string $K_{ENC}$ includes one or more conditions in clear and/or in the encrypted component, then these may represent standard terms and conditions of a party which wishes to establish this fact independently of any message encrypted with the encryption key string; in this case, the conditions (or a hash of the conditions) would need to be included in the hashed component of the encryption key string to enable a check on their integrity. Where only non confidential conditions were involved, such as Condition 1, then the encryption key string $K_{ENC}$ would be of the form:

$K20_{public}$
:: Condition 1
:: $H(K20_{private}$ :: nonce :: Condition 1)
:: $E(K20_{public}, N;$ nonce)

If the nonce is not required, then the encrypted component can be omitted. The condition or conditions included in such an encryption key can be replaced, or supplemented, by other data not intended to be an identifier of the data receiver 30 such as data about the data provider 20. This other data can, like the conditions, be included in clear and/or in the encrypted component and should also be included, directly or after hashing, in the hashed component if it is to be linked to the originator identity established for the encryption key string $K_{ENC}$.

Rather than using an un-keyed hash function such as SHA1, it is possible to use a keyed hash such as HMAC with the private key $K20_{private}$ (or other shared secret) being the hash key used for hashing the other element or concatenated elements of the hashed component. In this case, the trusted authority would use the same keyed hash function in seeking to compute a hash value matching that in the encryption key string $K_{ENC}$.

If the identity of the data provider is not an issue, then the encryption key string $K_{ENC}$ of the illustrated embodiment reduces to:

$K20_{public}$
:: Condition 1
:: H(H(msg) :: nonce :: Condition 1 :: Condition 2)
:: $E(K20_{public}, N;$ (H(msg) :: nonce :: Condition 2))

leaving only the elements forming the identifiers of the data receiver (Conditions 1 and 2) and those concerned with the message integrity (the in-clear component $K20_{public}$ is retained to facilitate the trusted authority obtaining the key $K20_{private}$ for decrypting the encrypted component, though as already discussed, in appropriate circumstances the component $K20_{public}$ can be omitted). If only message integrity is of interest (for example, if there are no conditions), then the hashed component of this reduced form of the encryption key string $K_{ENC}$ can be removed leaving:

$K20_{public}$
:: $E(K20_{public}, N;$ (H(msg) :: nonce))

In fact, since $K20_{public}$ is public, encrypting the message hash does not serve much purpose as anyone wishing to provide a substitute message for that originally sent can also change the message hash and encrypt it accordingly. However, if the message hash, with or without the addition of a nonce, is encrypted using a private key (whether of a public/private key pair or a secret symmetric key) the message hash is protected from change and serves its purpose of providing a message integrity check for the original message. Rather than using the private key to encrypt the message hash, it can be used to form a keyed hash, such as HMAC, of the message. The trusted authority can be arranged to determine the correct private key to use for checking either by trial and error through a limited set of such keys, or by the inclusion in the encryption key string $K_{ENC}$ of a suitable indicator in clear.

Whether the message hash is included in a protected form or another form (such as in clear or encrypted with a public key) in the encryption key string $K_{ENC}$, its inclusion permits detection of non malicious changes in the encrypted message such as may result from problems in the communications path. At its simplest, inclusion of the message hash, in clear or in a derived form, into the encryption key string $K_{ENC}$ provides a link between the encryption key string and the message giving rise to the included hash value. Whilst this does not have utility without the addition of further data into the encryption key string, it is primarily of interest for associating such further data included in the key $K_{ENC}$ with the message, this further data being, for example, identity information of the data provider and/or data receiver as has already described.

As regards the inclusion in the encryption key string $K_{ENC}$ of conditions serving to identify the data receiver, it will be appreciated that the number of in-clear and encrypted conditions can be varied from that described above for the illustrated embodiment. Thus, there may be none, one or more in-clear conditions and none, one or more encrypted conditions, in any combination. Furthermore, where the conditions are already known to the data receiver 30, the conditions need not be included as such in the encryption key string $K_{ENC}$ but they should still included in the hashed component to enable the trusted authority to confirm that the conditions passed to it by the data receiver correspond to those intended by the data provider and included in the hashed component. In this case, for the illustrated embodiment, the encryption key string $K_{ENC}$ reduces to:

$K20_{public}$
:: $H(K20_{private}$ :: H(msg) :: nonce :: Condition 1)
:: $E(K20_{public}, N;$ (H(msg) :: nonce))

there being no Condition 2 as this example only involves conditions known to the data receiver. If the data-provider identity information and message hash data are not required and the nonce is omitted, the encryption key string $K_{ENC}$ further reduces to:

H(Condition 1)

This is of value because it ensures that the data receiver can only read the encrypted message data supplied by the data provider if it presents, and satisfies, the correct condition 1 to the trusted authority. The data receiver cannot alter the hash value to match a different condition as this would result in a decryption key $K_{DEC}$ that would not serve to decrypt the received encrypted message data.

It may be noted that it is possible to achieve a similar result to that of the foregoing paragraph without using an IBE schema for the encryption and decryption keys $K_{ENC}$, $K_{DEC}$. Consider a situation where the trusted authority has a secret key $K_T$ which it uses to generate a secret key $K_p$ for the data provider 20 (the subscript "p" here standing for the data Provider):

$K_p = HMAC(K_T, \text{identifier of data provider})$

This enables the data provider 20 to generate a symmetric key $K_{PR}$:

$K_{PR} = HMAC(K_p, \text{identifier of data receiver})$ where the identifier of the data receiver is the Condition 1. The key $K_{PR}$ is then used with a symmetric encryption algorithm to encrypt the message data which the data provider then sends, along with its identifier, to the data receiver. In order for the data receiver to obtain the key $K_{PR}$ for decrypting the message data, it must provide its identifier (Condition 1) and that of the data provider to the trusted authority who can now compute the key $K_{PR}$ as it already knows $K_p$ or can re-compute it; assuming that the data receiver meets the Condition 1, the trusted authority then returns the key $K_{PR}$ to the data receiver to enable the latter to decrypt the encrypted message data. If the data receiver supplies a modified Condition 1, the resultant key will not decrypt the encrypted message data. By also sending a hash of the key $K_{PR}$, the data provider can provide assurance to the trusted authority that $K_{PR}$ has been created by the data provider.

With regard to the above-described reduced forms of the encryption key string $K_{ENC}$, it will be understood by persons skilled in the art that the FIG. 4 process carried out by the trusted authority is appropriately modified to omit any unnecessary computation or checks and to effect any changes needed to take account of the changed form of the encryption key string $K_{ENC}$.

It will also be understood by persons skilled in the art that where elements are concatenated before being operated upon by a hashing or encryption function, the order of concatenation can be varied from that described above provided that the ordering is used consistently (for example, the trusted authority 40, when computing the hash value in step 67 of FIG. 4, must use the same ordering of the concatenated elements as used by the data provider 20 when generating the encryption key string $K_{ENC}$). Indeed, elements can be combined in ways other than by concatenation. Thus, the concatenation operations performed by the data provider 20 that must be reversed by the trusted authority 40 can be replaced by any reversible combination function, whilst the concatenation operation performed by the data provider 20 in combining the elements for the hashed component:

$H(K20_{private} :: H(msg) :: \text{nonce} :: \text{Condition 1} :: \text{Condition 2})$ (or any simplified version discussed above) can be replaced by any deterministic combination function (the trusted authority needing only to be able to repeat the combination, not reverse it). Of course, the trusted authority and data provider must know to use the same combination functions.

The invention claimed is:

1. A data encryption method comprising a first party encrypting first data using as encryption parameters both:
   an encryption key string formed using at least a hash value generated using both second data and a secret, shared with a trusted party, that serves as identification of the first party; and
   public data provided by the trusted party and related private data held by the trusted party.

2. A method according to claim 1, wherein said hash value is generated by hashing a deterministic combination of the shared secret and the second data.

3. A method according to claim 1, wherein said hash value is generated using a keyed hash function with the shared secret forming the key used by this function and the second data forming the data operated on by the keyed hash function.

4. A method according to claim 1, wherein the shared secret comprises the private key, generated by the trusted party, of a public/private key pair associated with the first party.

5. A method according to claim 1, wherein the shared secret comprises a symmetric key.

6. A method according to claim 1, wherein the second data comprises a hash-value element generated by hashing the first data, this hash-value element being used for the encryption key string either in clear or in encrypted form for recovery by the trusted party.

7. A method according to claim 1, wherein the second data comprises at least one condition serving as an identifier of an intended recipient of the first data.

8. A method according to claim 7, wherein a said condition is included in encrypted form in the encryption key string for recovery by the trusted party.

9. A method according to claim 7, wherein a said condition is included in clear in the encryption key string.

10. A method according to claim 9, wherein a further said condition is included in encrypted form in the encryption key string for recovery by the trusted party.

11. A method according to claim 1, wherein the second data comprises a nonce, this nonce being included in encrypted form in the encryption key string for recovery by the trusted party.

12. A method according to claim 1, wherein forming the encryption key string further uses encrypted third data intended for recovery by the trusted party, this third data comprising at least one element in common with the second data where said at least one element
   comprises one or more of the following elements:
      a hash-value element generated by hashing the first data;
      at least one confidential condition serving as an identifier of an intended recipient of the first data;
      a nonce.

13. A method according to claim 12, wherein the third data is encrypted using the public key of a public/private key pair associated with the first party where the private key of the key pair is available to the trusted party.

14. A method according to claim 1, wherein the encryption key string further comprises an identifier of the first party in clear.

15. A method according to claim 14, wherein the identifier of the first party is the public key of a public/private key pair associated with the first party, the private key of which forms the said shared secret.

16. A method according to claim 1, wherein the encryption process effected using said encryption key string and the public data of the trusted party is an identifier-based cryptographic process utilising quadratic residuosity.

17. A method according to claim 1, wherein the encryption process effected using said encryption key string and the public data of the trusted party is an identifier-based cryptographic process utilising Weil or Tate pairings.

18. A data encryption method comprising encrypting first data using both an encryption key string and public data provided by a trusted party and related to private data of the trusted party; the encryption key string comprising:
   a first component comprising the public key of a public/private key pair associated with the first party and the private key of which is available to the trusted party;
   a second component comprising none, one or more non-confidential conditions serving as identifiers of an intended recipient of the first data;
   a third component comprising a hash value generated using both the private key of said public/private key pair and second data comprising said non-confidential conditions if any, one or more confidential conditions that also serve as identifiers of said intended recipient, and a hash-value element generated by hashing the first data; and
   a fourth component formed by encrypting data comprising said confidential conditions if any, and said hash-value element generated by hashing the first data.

19. A method according to claim 18, wherein the encryption process effected using said encryption key string and the public data of the trusted party is an identifier-based cryptographic process utilising quadratic residuosity.

20. A method according to claim 19, wherein the encryption process effected using said encryption key string and the public data of the trusted party is an identifier-based cryptographic process utilising Weil or Tate pairings.

21. Apparatus for encrypting first data, the apparatus comprising:
   a first hash arrangement for generating a hash value by using both second data and a secret, shared with a trusted party, that serves as identification of the first party;

a keystring-forming arrangement for forming an encryption key swing using at least said hash value; and a first encryption arrangement for encrypting the first data using as encryption parameters both said encryption key string and public data provided by a trusted party and related to private data of the trusted party.

22. Apparatus according to claim 21, wherein the first hash arrangement is arranged to generate said hash value by hashing a deterministic combination of the shared secret and the second data.

23. Apparatus according to claim 21, wherein the first hash arrangement is arranged to generate said hash value in accordance with a keyed hash function with the shared secret forming the key used by this function and the second data forming the data operated on by the keyed hash function.

24. Apparatus according to claim 21, further comprising a key store for storing a private key, generated by the trusted party, as part of a public/private key pair associated with the first party, the first hash arrangement being arranged to use this stored private key as said shared secret.

25. Apparatus according to claim 21, further comprising a key provision arrangement for providing a symmetric key the first hash arrangement being arranged to use this symmetric key as said shared secret.

26. Apparatus according to claim 21, further comprising a second hash arrangement for generating said second data by hashing the first data, the keystring-forming arrangement being arranged to use this hash-value element for the encryption key string either in clear or in encrypted form for recovery by the trusted party.

27. Apparatus according to claim 21, wherein the second data comprises at least one condition serving as an identifier of an intended recipient of the first data.

28. Apparatus according to claim 27, further comprising a second encryption arrangement for encrypting a said condition, the keystring-forming arrangement being arranged to include this encrypted condition in the encryption key string for recovery by the trusted party.

29. Apparatus according to claim 27, wherein the keystring-forming arrangement is arranged to include a said condition in clear in the encryption key swing.

30. Apparatus according to claim 29, further comprising a second encryption arrangement for encrypting a further said condition, the keystring-forming arrangement being arranged to include this encrypted further condition in the encryption key string for recovery by the trusted party.

31. Apparatus according to claim 21, further comprising a second encryption arrangement for encrypting a nonce, the keystring-forming arrangement being arranged to include this encrypted nonce in the encryption key swing for recovery by the trusted party.

32. Apparatus according to claim 21, further comprising a second encryption arrangement for encrypting third data, the keystring-forming arrangement being arranged to include this encrypted third data in the encryption key string for recovery by the trusted party, this third data comprising at least one element in common with the second data where said at least one element comprises one or more of the following elements:
   a hash-value element that is a hash of the first data;
   at least one confidential condition serving as an identifier of an intended recipient of the first data;
   a nonce.

33. Apparatus according to claim 32, further comprising a key store for storing a public key of a public/private key pair associated with the first party where the private key of the key pair is available to the trusted party, the second encryption arrangement being arranged to use this stored public key for encrypting the third data.

34. Apparatus according to claim 21, wherein the keystring-forming arrangement is arranged to include in the encryption key string an identifier of the first party in clear.

35. Apparatus according to claim 34, further comprising a key store for storing a public/private key pair associated with the first party, the keystring-forming arrangement being arranged to use the public key of this public/private key pair as said the identifier of the first party, and the first hash arrangement being arranged to use the private key of the public/private key pair as said shared secret.

36. Apparatus according to claim 21, wherein the first encryption arrangement is arranged to encrypt the first data, using said encryption key string and the public data of the trusted party, in accordance with an identifier-based cryptographic process utilising quadratic residuosity.

37. Apparatus according to claim 21, wherein the first encryption arrangement is arranged, to encrypt the first data, using said encryption key string and the public data of the trusted party, in accordance with an identifier-based cryptographic process utilising Weil or Tate pairings.

38. A computer program stored on a storage medium for conditioning programmable apparatus to provide: a first hash arrangement for generating a hash value by using both second data and a secret, shared with a trusted party, that serves as identification of the first party;
   a keystring-forming arrangement for forming an encryption key swing using at least said hash value; and
   a first encryption arrangement for encrypting the first data using as encryption parameters both said encryption key string and public data provided by a trusted party and related to private data of the trusted party.

39. Apparatus for encrypting first data, the apparatus comprising:
   a first component-provision arrangement for providing a first component comprising the public key of a public/private key pair associated with the first party and the private key of which is available to the trusted party;
   a second component-provision arrangement for providing a second component comprising none, one or more non-confidential conditions serving as identifiers of an intended recipient of the first data;
   a third component-provision arrangement for providing a third component comprising a hash value generated using both the private key of said public/private key pair and second data comprising said non-confidential conditions if any, one or more confidential conditions that also serve as identifiers of said intended recipient, and a hash-value element generated by hashing the first data; and
   a fourth component-provision arrangement for providing a fourth component by encrypting data comprising said confidential conditions if any, and said hash-value element generated by hashing the first data;
   a keystring-forming arrangement for forming an encryption key swing by effecting a reversible combination of the first, second, third and fourth components;
   an encryption arrangement for encrypting the first data using as encryption parameters both said encryption key string and public data provided by a trusted party and related to private data of the trusted party.

40. A data transfer method comprising:
   encrypting first data at a first party using as encryption parameters both:

an encryption key string formed using at least a hash value generated using both second data and a secret, shared with a trusted party, that serves as identification of the first party; and public data provided by the trusted party and related private data held by the trusted party;

sending the encrypted first data and the encryption key string to a second party;

providing the encryption key string from the second party to the trusted party;

at the trusted party, carrying out at least one check on the basis of data contained in the encryption key string and, if said at least one check is satisfactory, providing a decryption key to the second party, this decryption key being generated by the trusted party using the encryption key string and its private data.

41. A method according to claim 40, wherein the encryption key string includes at least one said condition, the trusted party extracting said at least one condition from the encryption key string including by effecting any required decryption; said at least one check comprising a check that the or each said at least one condition is met by the second party.

42. A method according to claim 40, wherein said at least one check comprises a check on the hash value contained in the encryption key, this check comprising:

extracting the constituent elements of said second data from the encryption key string, including by effecting any required decryption, and re-forming the second data;

obtaining said shared secret by lookup in a data store or by regeneration;

using the re-formed second data and the obtained shared secret to compute a hash value;

comparing the hash value computed by the trusted party with that contained in the encryption key string;

the check being satisfactory if the compared values match.

43. A method according to claim 42, wherein the encryption key string includes at least one said condition, the trusted party extracting said at least one condition from the encryption key string including by effecting any required decryption;

said at least one check comprising a check that the or each said at least one condition is met by the second party.

44. A method according to claim 21, wherein the encryption key string includes at least one said condition which also forms an element of the second data, the trusted party extracting said at least one condition from the encryption key string including by effecting any required decryption;

the trusted party, as well as carrying out the hash value check, also carrying out a said check to check that the or each said at least one condition is met by the second party.

45. A method according to claim 21, wherein the second data comprises at least one said condition that is not included as such in the encryption key string, the second party passing the or each such condition to the trusted party, the trusted party carrying out the hash value check with the or each said condition supplied by the second party being used in re-forming the second data, and the trusted party carrying out a further said check to check that the or each said at least one condition is met by the second party.

46. A method according to claim 40, wherein said encryption key string includes the hash of the first data in encrypted form and wherein in the event said at least one check is satisfactory, the trusted party passes the decrypted hash of the first data to the second party along with the decryption key; the second party, after decrypting the first data, checking its integrity by calculating its hash and comparing this calculated value with that provided by the trusted party.

* * * * *